(12) United States Patent
Götze et al.

(10) Patent No.: US 11,361,079 B2
(45) Date of Patent: Jun. 14, 2022

(54) CHIPSET WITH PROTECTED FIRMWARE

(71) Applicant: GIESECKE+DEVRIENT MOBILE SECURITY GMBH, Munich (DE)

(72) Inventors: Frank Götze, Munich (DE); Claus Dietze, Obersochering (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 771 days.

(21) Appl. No.: 16/319,593

(22) PCT Filed: Jul. 20, 2017

(86) PCT No.: PCT/EP2017/000885
§ 371 (c)(1),
(2) Date: Jan. 22, 2019

(87) PCT Pub. No.: WO2018/015018
PCT Pub. Date: Jan. 25, 2018

(65) Prior Publication Data
US 2021/0073385 A1    Mar. 11, 2021

(30) Foreign Application Priority Data
Jul. 22, 2016 (DE) .......................... 102016008902.4

(51) Int. Cl.
*G06F 21/64* (2013.01)
*G06F 9/445* (2018.01)
(Continued)

(52) U.S. Cl.
CPC ............ *G06F 21/572* (2013.01); *G06F 9/445* (2013.01); *G06F 21/575* (2013.01); *G06F 21/64* (2013.01);
(Continued)

(58) Field of Classification Search
CPC ...... G06F 21/572; G06F 9/445; G06F 21/575; G06F 21/64; G06F 2221/034;
(Continued)

(56) References Cited

U.S. PATENT DOCUMENTS

2010/0011214 A1* 1/2010 Cha ..................... H04L 63/123
713/175
2010/0070800 A1* 3/2010 Hanna .................. G06F 21/575
714/6.12
(Continued)

FOREIGN PATENT DOCUMENTS

EP    2164017 A2    3/2010

OTHER PUBLICATIONS

German Office Action from DE Application No. 102016008902.4, dated May 5, 2017.
(Continued)

*Primary Examiner* — Michael J Brown
(74) *Attorney, Agent, or Firm* — Workman Nydegger

(57) ABSTRACT

A chipset for an end device comprises at least a Secure Processor into which a one-time programmable memory storage is integrated, wherein in the chipset at least an end-device serial number of the end device is stored, wherein in the one-time programmable memory information is stored for securing the end-device serial number against tampering.

8 Claims, 1 Drawing Sheet

(51) Int. Cl.
*H04L 9/08* (2006.01)
*G06F 21/57* (2013.01)

(52) U.S. Cl.
CPC ...... *H04L 9/0897* (2013.01); *G06F 2221/034* (2013.01); *H04L 2209/127* (2013.01)

(58) Field of Classification Search
CPC ............. G06F 2221/033; H04L 9/0897; H04L 2209/127; H04L 9/3239
USPC ................................................ 713/1, 2, 100
See application file for complete search history.

(56) References Cited

U.S. PATENT DOCUMENTS

2012/0084438 A1  4/2012  Raleigh et al.
2015/0113258 A1  4/2015  Grieco et al.

OTHER PUBLICATIONS

International Search Report from PCT Application No. PCT/EP2017/000885, dated Sep. 27, 2017.
Khalid et al., "On Implementing Trusted Boot for Embedded Systems," IEEE International Symposium on Hardware-Oriented Security and Trust, 2013, pp. 75-80.

* cited by examiner

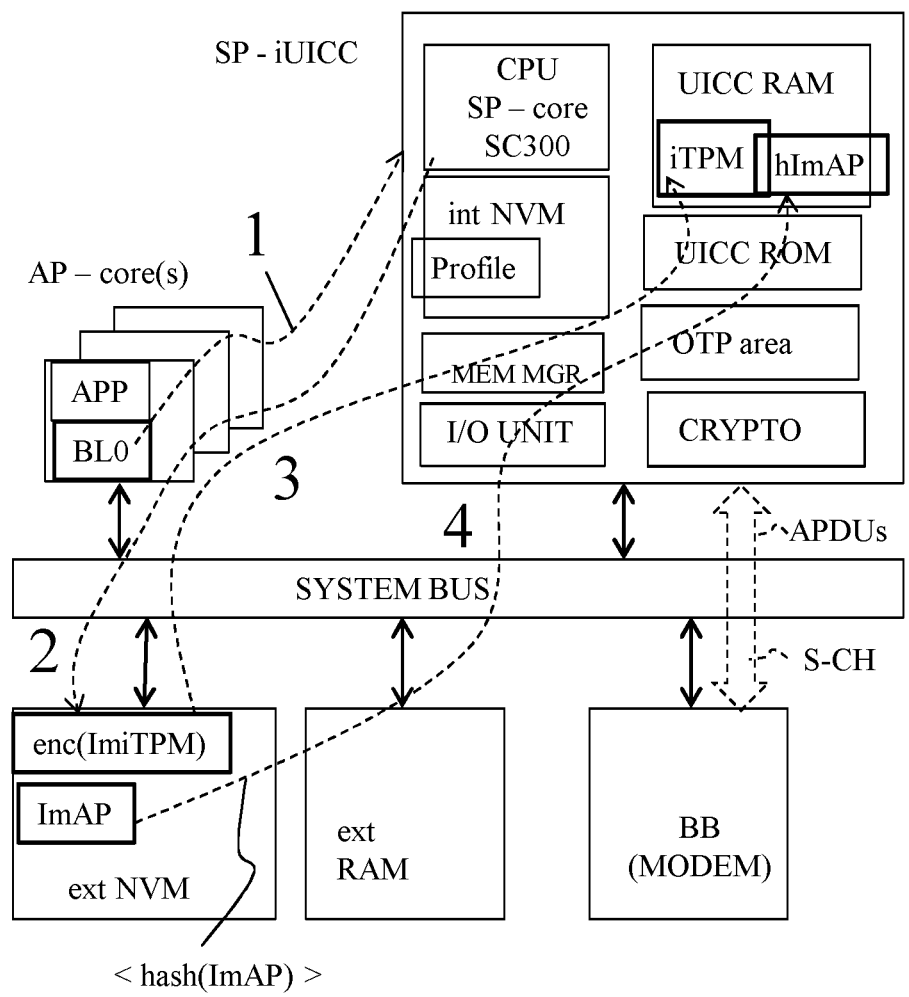

CHIPSET WITH PROTECTED FIRMWARE

FIELD OF THE INVENTION

The invention relates to a chipset for an end device capable of mobile communications having a Secure Processor and an Application Processor, wherein in the end device, in particular in the Application Processor, firmware is implemented.

PRIOR ART

The world is networked in a mobile manner, and mobile networking continues to progress. End devices capable of mobile radio communications communicate via mobile radio communication networks. The mobile end devices like smartphones and mobile telephones and tablets capable of mobile communications are among the classic end devices capable of mobile radio communications. End devices capable of mobile communications also include control devices (control devices or measuring devices or combined control/measuring devices) for industrial installations in commercial or private environment. Industrial installations are, for example, production plants which have one or several control devices (end devices) which can communicate with a background system or/and with each other over a mobile radio communication network. Further industrial installations are Smart Home devices such as heating means or power consumers having end devices in the form of control devices.

The end device has a chipset having one or several end-device chips for operating functions of the end device. Current (and older) smartphones have, for example, typically a chipset which comprises at least three end-device chips, namely a Transceiver IC which carries out the physical radio communication, a Baseband Processor BB (or equivalently modem) which carries out functions for transmitting data via radio communication at protocol level, and an Application Processor AP on which the operating system and application software, e.g. applications (e.g. apps), are executed. As further end device chips, transceiver ICs can be provided for other radio channels, in particular for short-range radio channels like NFC (NFC: near field communication) or Bluetooth. On the chipset, in particular on the Application Processor AP, firmware is implemented, i.e. special software by which basic functionalities of the chipset are realized. The firmware includes e.g. the operating system of the Application Processor and possibly the operating system of further processors which have an operating system, hardware-related software e.g. of the Transceiver IC and the Baseband Processor BB, and in some cases programming interfaces (APIs).

For utilizing an end device capable of mobile radio communications such as a smartphone, mobile telephone, in a mobile radio communication network of a network provider, the end device contains a subscriber identity module having a subscription profile or profile, for short. The profile achieves the configuration of the end device and the connection of the end device in the mobile radio communication network. The profile is formed by a structured data set which enables the setting up, operating and disconnecting of a connection of the end device in the mobile radio communication network, and comprises, for example, a cryptographic authentication key Ki and an International Mobile Subscriber Identity IMSI.

The subscriber identity module can conventionally be integrated into carriers of different form factors, in particular plug-in and embedded carriers. Subscriber identity modules in carriers of the form factor plug-in (e.g. classic SIM card) and Embedded (module provided for soldering into an end device) are arranged on a dedicated, separate chip or SoC (System on Chip).

A newer concept for the form factor of a subscriber identity module are integrated subscriber identity modules which are integrated on an end-device chip or SoC (System on Chip) of the end device, thus do not possess a separate chip. Integrated subscriber identity modules are furnished with the addition "integrated" or "i" and are designated, e.g., as integrated UICC, iUICC, iSIM or iUSIM.

The firmware of an end device should be tamperproof for the user. Normally so-called Trusted Platform Modules TPMs are known for securing functionalities, thus secure runtime environments on chips, having certain specified security functions which a normal chip having a normal runtime environment does not have.

In an end device whose chipset has a Secure Processor SP having an iUICC integrated in the Secure Processor SP, it would be expedient to also implement in the Secure Processor a Trusted Platform Module TPM assigned to the firmware, by which the firmware of the chipset is secured.

The firmware of the chipset can be designed very differently for different types and classes of end devices and have different demands as to the firmware-securing Trusted Platform Module TPM. In Trusted Platform Module TPM implemented in the Secure Processor SP, the Secure Processor SP would therefore have to be designed differently for every different Trusted Platform Module TPM.

A Secure Processor SP must usually be evaluated using standardized checking methods. Almost every change of the Secure Processor SP requires a renewed evaluation. Therefore, a TPM implemented in the Secure Processor SP for securing firmware can increase the evaluation effort for the Secure Processor immensely.

SUMMARY OF THE INVENTION

The invention is based on the object of stating a chipset for an end device capable of mobile radio communications in which the firmware of the chipset is secured in an efficient manner.

The object is achieved by a chipset according to claim 1. Advantageous embodiments of the invention are stated in dependent claims.

The chipset according to the invention according to claim 1 has an integrated Trusted Platform Module iTPM stored in the chipset but outside the Secure Processor, by which the firmware is secured. The iTPM is loaded into the working memory of the Secure Processor only for execution and is executed there. This loading of the iTPM is initiated by a basic Bootloader implemented in the Application Processor, which is started immediately upon the putting into operation of the chipset. From this Bootloader, the execution of the iTPM in the Secure Processor is initiated (e.g. in the internal exclusive working memory of the Secure Processor) and subsequently the firmware is verified by iTPM as to integrity.

Because the Trusted Platform Module iTPM assigned to the potentially variable firmware is stored outside the Secure Processor and is loaded into the working memory of the Secure Processor only for execution, the Secure Processor can remain restricted to very basic, possibly not variable functionalities.

With respect to evaluations of the chipset, the Secure Processor has to be evaluated in the best case only a single time in its basis form. As needed, the chip component in which the Trusted Platform Module iTPM is permanently stored, e.g. a non-volatile storage situated outside the Secure Processor, is separately evaluated. This is considerably less effort than to evaluate the entire Secure Processor anew each time for every firmware variation which a TPM variation entails.

Therefore a chipset is stated according to claim 1 for an end device capable of mobile radio communications in which the firmware of the chipset is secured in an efficient manner.

The assignment between iTPM and the TPM Bootloader is attained, for example, by corresponding pointers by which the execution control of the TPM Bootloader is transferred to the iTPM.

The integrated Trusted Platform Module iTPM is devised according to one embodiment to generate a result of checking the integrity and to report it to the TPM Bootloader (BL0). The result of checking is in particular either integrity of firmware verified or integrity of firmware not verified.

According to one embodiment of the invention, the Bootloader is further devised to receive a result reported from the integrated Trusted Platform Module iTPM of the checking of the integrity, in particular either integrity verified or integrity not verified. In the process, the bootloader is further devised, (i) to continue the putting into operation of the chipset on the occasion of a result of the checking integrity verified; and (ii) to affect an error measure, in particular to not continue or to abort the putting into operation of the chipset on the occasion of a result of checking integrity not verified. According to this embodiment, a concrete implementation possibility is therefore stated to secure the firmware by an integrated Trusted Platform Module iTPM, by being able to take only a successfully verified firmware successfully into complete operation, suspicious or faulty firmware not, however.

According to embodiments of the invention, the chipset further comprises a secure working memory assigned exclusively to the Secure Processor, and an external non-volatile storage situated in the chipset but outside the Secure Processor. In the external non-volatile storage, a memory image, also called image, of the iTPM is stored. Further, a memory image (image) of the firmware, in particular a memory image (image) of the firmware of the Application Processor, is stored in the external non-volatile storage. Memory images of further firmware components can also be stored there. In the process, the integrated Trusted Platform Module iTPM is started by loading the memory image (image) iTPM from the external non-volatile storage into the secure working memory, so that the integrated Trusted Platform Module iTPM is thus brought to execution in the Secure Processor. For checking the firmware as to integrity, the memory image of the firmware, in particular memory image of the firmware of the Application Processor, or a value derived from the memory image, in particular hash value, is loaded from the external non-volatile storage into the secure working memory and this memory image is checked in the secure working memory as to integrity.

Electively, the memory image of the iTPM is stored in encrypted form in the external nonvolatile memory and can be brought to execution exclusively by the Secure Processor, but not by other processors arranged outside the Secure Processor, and also not in working memories arranged outside the Secure Processor. Therefore, the iTPM is secured against attacks even during the runtime of the iTPM.

Electively, the TPM Bootloader is devised to bring the integrated Trusted Platform Module iTPM to execution on the Secure Processor by being devised to prompt the following method. Step 1: Transferring the execution control of the TPM Bootloader to the Secure Processor (SP); Steps 2, 3: by the Secure Processor, more precisely by a CPU or a processor core of the Secure Processor, loading the integrated Trusted Platform Module iTPM into the Secure Processor and executing the integrated Trusted Platform Module iTPM in the Secure Processor.

The loading of the integrated Trusted Platform Module iTPM into the Secure Processor is carried out according to embodiments of the invention as loading the memory image from the external non-volatile storage into the secure working memory of the Secure Processor.

The memory image loaded into the secure working memory is decrypted as needed, if it is stored in the external non-volatile storage in encrypted form, in the secure working memory and is then brought to execution there.

BRIEF DESCRIPTION OF THE DRAWINGS

Hereinafter, the invention will be explained more closely on the basis of exemplary embodiments and with reference to the drawing, in which is shown:

FIG. 1 in schematic representation a chipset according to one embodiment of the invention.

DETAILED DESCRIPTION OF EMBODIMENT EXAMPLES

FIG. 1 shows, in schematic representation, a chipset according to one embodiment of the invention.

The chipset comprises a Secure Processor SP which fulfills, inter alia, the function of an integrated subscriber identity module iUICC. The Secure Processor SP has a CPU or—equivalently—a processor core, an internal non-volatile memory int NVM (e.g. flash or/and EEPROM) in which one or several subscription profiles are stored, a storage management MEM MGR, an interface I/O unit, an internal working memory UICC RAM assigned exclusively to the Secure Processor SP, an internal, exclusive permanent memory UICC ROM of the Secure Processor SP (the ROM is optional; instead, only flash memory can be provided, as is increasingly the case in real processors), a comparatively small specifically secured permanent memory OTP area (in storage technology realized e.g. as ROM, EEPROM or Flash), and a crypto unit CRYPTO, e.g. a crypto coprocessor.

The chipset further comprises an Application Processor AP having—here several—processor cores. Applications are implemented in the Application Processor AP as apps APP. According to the invention, further a Bootloader BL0 is implemented in the Application Processor AP, which begins to boot immediately upon the starting of the chipset.

Further, the chipset comprises an external non-volatile storage ext NVM, in which an encrypted memory image or—equivalently—image enc(ImiTPM) of an integrated Trusted Platform Module iTPM is stored. Further, in the external non-volatile memory ext NVM a memory image or, equivalently, image ImAP of the firmware of the Application Processor AP is stored.

In addition the chipset comprises an external working memory ext RAM generally accessible in the chipset and a Baseband Processor BB (modem).

The components SP, AP, ext NVM, ext RAM, BB of the chipset are interconnected via a system bus of the chipset.

A secure transmission channel S-CH between the Baseband Processor BB and the Secure Processor SP can be devised physically over the system bus via which commands can be exchanged between the Baseband Processor BB and the Secure Processor SP in the format of APDU commands.

Hereinafter, a method is described on the basis of FIG. 1 for verifying firmware of the chipset, connected with a controlled booting and, where applicable, aborting of the booting of the chipset.

The operation of the chipset is started. If the chipset is incorporated in a smartphone, the operation is e.g. started by switching on the smartphone at the proper on-switch.

On the occasion of starting the operation of the chipset, the TPM Bootloader BL0 implemented in the Application Processor AP and assigned to the iTPM is started. By the assignment of the Bootloader BL0 to the iTPM, it is attained that the Bootloader BL0 triggers a firmware verification before it further boots. For this purpose, the Bootloader BL0 transfers (Step 1) the control of the program execution to the Secure Processor SP, in connection with a statement that the iTPM is to be started for the firmware verification. The transfer is effected, e.g., by means of a corresponding pointer in the Bootloader. The Secure Processor SP (Step 2) calls up the encrypted image iTPM, enc(ImiTPM), from the external non-volatile storage and (Step 3) loads it into the internal, exclusive working memory UICC RAM of the Secure Processor SP. This is effected, e.g., by means of a corresponding pointer or another suitable address statement in the Secure Processor SP by which finally the call-up of the iTPM from the external nonvolatile memory ext NVM is attained in the internal working memory UICC RAM of the Secure Processor SP. In the internal exclusive working memory UICC RAM, the Secure Processor Core CPU/SP-core decrypts the encrypted image enc(ImiTPM) and brings it to execution. The executing, integrated Trusted Platform Module iTPM accomplishes its registered duty of verifying the firmware, in the example of FIG. 1 the firmware of the Application Processor AP. For this purpose, the iTPM loads a hash value hash(ImAP), hImAP, via the stored image ImAP of the Application Processor AP stored in the external non-volatile storage ext NVM into the internal working memory UICC RAM of the Secure Processor SP. For verifying the Application Processor firmware hImAP, for example, the hash value is again formed via the Application Processor firmware hImAP and compared with the hash value stored in the external working memory ext RAM.

The integrated Trusted Platform Module iTPM thus checks the firmware of the Application Processor AP as to integrity (Step 4). The integrated Trusted Platform Module iTPM generates a result of the checking of the integrity and reports the result back to the TPM Bootloader BL0. The result is in particular either integrity of the firmware verified or integrity of the firmware not verified, i.e. integrity doubtful or non-existent. If it is reported from the iTPM that the integrity of the checked firmware has been verified successfully, the chipset boots up the Bootloader BL further and puts it completely into operation according to plan. If it is reported from the iTPM that the integrity of the checked firmware has not been verified successfully (i.e. the integrity of the firmware is doubtful or not present), the booting procedure and thereby the putting into operation of the chipset is not continued or aborted. Additionally (or alternatively) further error measures can be taken.

The invention claimed is:

1. A chipset for an end device, the chipset comprising:
a Secure Processor; and
an Application Processor, wherein in the end device, in the Application Processor, firmware is implemented;
wherein the chipset comprises
an integrated Trusted Platform Module iTPM executable in the Secure Processor and stored outside the Secure Processor; and
a TPM Bootloader, implemented in the Application Processor and assigned to the iTPM, which is started on the occasion of starting the operation of the chipset;
wherein the TPM Bootloader is devised to cause loading and bringing to execution the integrated Trusted Platform Module iTPM on the Secure Processor; and
wherein the integrated Trusted Platform Module iTPM is devised to check the firmware as to integrity, in the firmware of the Application Processor.

2. The chipset according to claim 1, wherein the integrated Trusted Platform Module iTPM is devised to generate and to report to the TPM Bootloader a result of checking the integrity, in either integrity of the firmware verified or integrity of the firmware not verified.

3. The chipset according to claim 2, wherein the Bootloader is further devised
to receive a result reported by the integrated Trusted Platform Module iTPM of checking the integrity, either integrity verified or integrity not verified, and
(i) to continue the putting into operation of the chipset on the occasion of a result of checking integrity verified; and
(ii) to affect an error measure, to not continue or to abort the putting into operation of the chipset on the occasion of a result of checking integrity not verified.

4. The chipset according to claim 1, further comprising:
a secure working memory assigned exclusively to the Secure Processor;
an external non-volatile storage situated in the chipset but outside the Secure Processor, in which is stored
a memory image of the iTPM; and
a memory image of the firmware of the Application Processor;
wherein to start the integrated Trusted Platform Module iTPM, the memory image of the iTPM is loaded from the external non-volatile storage into the secure working memory and brought to execution there; and
wherein, for checking the firmware as to integrity, the memory image of the firmware of the Application Processor, or a value derived from the memory image, including a hash value, is loaded from the external non-volatile storage into the secure working memory and this memory image is checked in the secure working memory as to integrity.

5. The chipset according to claim 4, wherein the storage image of the iTPM is stored in encrypted form in the external non-volatile storage and can be brought to execution exclusively by the Secure Processor.

6. The chipset according to claim 4, wherein the loading of the integrated Trusted Platform Module iTPM into the Secure Processor is carried out as loading the memory image from the external non-volatile storage into the secure working memory.

7. The chipset according to claim 6, wherein the memory image loaded into the secure working memory is decrypted in the secure working memory and is then brought to execution.

8. The chipset according to claim 1, wherein the TPM Bootloader is devised to bring the integrated Trusted Platform Module iTPM to execution on the Secure Processor by being devised to prompt the following method:
transferring the execution control of the TPM Bootloader to the Secure Processor;

by the Secure Processor, loading the integrated Trusted Platform Module iTPM into the Secure Processor;
executing the integrated Trusted Platform Module iTPM in the Secure Processor.

\* \* \* \* \*